(12) United States Patent
Shao et al.

(10) Patent No.: US 6,725,659 B1
(45) Date of Patent: Apr. 27, 2004

(54) APPARATUS AND METHOD FOR LIMITING TURBOCHARGER SPEED

(75) Inventors: Jiasi Josh Shao, Columbus, IN (US); Long-Kung Hwang, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 10/321,274

(22) Filed: Dec. 16, 2002

(51) Int. Cl.⁷ .............................................. F02D 23/00
(52) U.S. Cl. ........................................................ 60/601
(58) Field of Search ........................... 60/601, 603, 608

(56) References Cited

U.S. PATENT DOCUMENTS

| | | | |
|---|---|---|---|
| 4,459,809 A | * | 7/1984 | Tadokoro et al. ............. 60/611 |
| 5,137,000 A | | 8/1992 | Stepper et al. |
| 5,268,842 A | | 12/1993 | Marston et al. |
| 5,363,652 A | * | 11/1994 | Tanaka et al. ................. 60/603 |
| 6,095,127 A | | 8/2000 | Kolmanovsky et al. |
| 6,155,050 A | * | 12/2000 | Blanz et al. ................... 60/603 |
| 6,192,867 B1 | * | 2/2001 | Fenchel et al. ............... 60/603 |
| 6,220,223 B1 | | 4/2001 | Weisman, II et al. |
| 6,234,149 B1 | | 5/2001 | Mills et al. |
| 6,314,359 B1 | | 11/2001 | Janic et al. |
| 6,408,624 B1 | | 6/2002 | Books et al. |
| 6,453,874 B1 | | 9/2002 | Duffy et al. |

* cited by examiner

Primary Examiner—Sheldon J. Richter
(74) Attorney, Agent, or Firm—Barnes & Thornburg

(57) ABSTRACT

A system for limiting rotational speed of a turbocharger includes means for determining a change in an engine operating parameter, a fueling system responsive to a fueling signal to supply fuel to the engine, and a controller determining a fueling command that is air-to-fuel or oxygen-to-fuel control (AFC/OFC) limited under certain engine operating conditions and is otherwise not AFC/OFC limited. The controller is operable to produce the fueling signal as a function of the fueling command, and to further limit the fueling signal according to a turbocharger speed fuel limit in a manner that limits the speed of the turbocharger to a first turbocharger speed limit whenever the fueling command is AFC/OFC limited. The controller is operable to remove the turbocharger speed fuel limit from the fueling signal when the change in the engine operating parameter exceeds a threshold value and the fueling command is thereafter no longer AFC/OFC limited.

22 Claims, 3 Drawing Sheets

APPARATUS AND METHOD FOR LIMITING TURBOCHARGER SPEED

FIELD OF THE INVENTION

The present invention relates generally to systems for limiting the rotational speed of a turbocharger coupled to an internal combustion engine, and more specifically to such systems operable to limit turbocharger speed by limiting fueling under specified conditions.

BACKGROUND AND SUMMARY OF THE INVENTION

In many internal combustion engine applications including a turbocharger, systems are known for limiting turbocharger rotational speed to prevent premature turbocharger damage and/or wear. It is desirable in some such applications to limit turbocharger rotational speed under normal engine operating conditions, but to also allow for increased turbocharger rotational speed and attendant increased engine performance when a bonafide need for increased engine performance exists.

The present invention comprises one or more of the following features or combinations thereof. A system for limiting rotational speed of a turbocharger coupled to an internal combustion engine. The system may include a fuel system responsive to a fueling signal to supply fuel to the engine and a controller determining a fueling command that is air-to-fuel or oxygen-to-fuel control (AFC/OFC) limited under certain engine operating conditions and is otherwise not AFC/OFC limited, wherein the controller produces the fueling signal as a function of the fueling command and also limits the fueling signal according to a turbocharger speed fuel limit in a manner that limits the rotational speed of the turbocharger to a first turbocharger speed limit whenever the fueling command is AFC/OFC limited. The controller may further remove the turbocharger speed fuel limit from the fueling signal when the change in the engine operating parameter exceeds a threshold value and the fueling command is thereafter no longer AFC/OFC limited.

The engine operating parameter may be any one or combination of engine acceleration, driver requested torque, turbocharger boost pressure, engine load, engine fueling, or the like.

The controller may further include a delay value stored therein, wherein the controller is operable to remove the turbocharger speed fuel limit from the fueling signal upon expiration of a time period defined by the delay value following the change in the engine operating parameter exceeding the threshold value and the fueling command thereafter no longer being AFC/OFC limited.

The controller may further include a transition rate value stored therein, wherein the controller is operable to remove the turbocharger speed fuel limit from the fueling signal at a rate defined by the transition rate value.

The controller may further include a fueling command determination strategy operable to determine the fueling command as a function of a number of engine operating condition signals. The fueling command determination strategy may include an AFC/OFC control strategy limiting a maximum value of the fueling command under the certain engine operating conditions, and otherwise not limiting the maximum value of the fueling command.

The controller may further include a final fueling determination strategy producing the fueling signal as a function of at least the fueling command. The controller may further include a number of fuel limiting strategies each providing a fuel limiting value to the final fueling determination strategy, wherein the final fueling determination strategy produce the fueling signal as a function of the fueling command and the number of fuel limiting values. The controller may further include a turbocharger speed fuel limit strategy providing the turbocharger speed fuel limit to the final fueling determination strategy, wherein the final fueling determination strategy limits the fueling signal according to the turbocharger speed fuel limit.

These and other objects of the present invention will become more apparent from the following description of the illustrative embodiments.

DESCRIPTION OF THE ILLUSTRATIVE EMBODIMENTS

Figure 1:
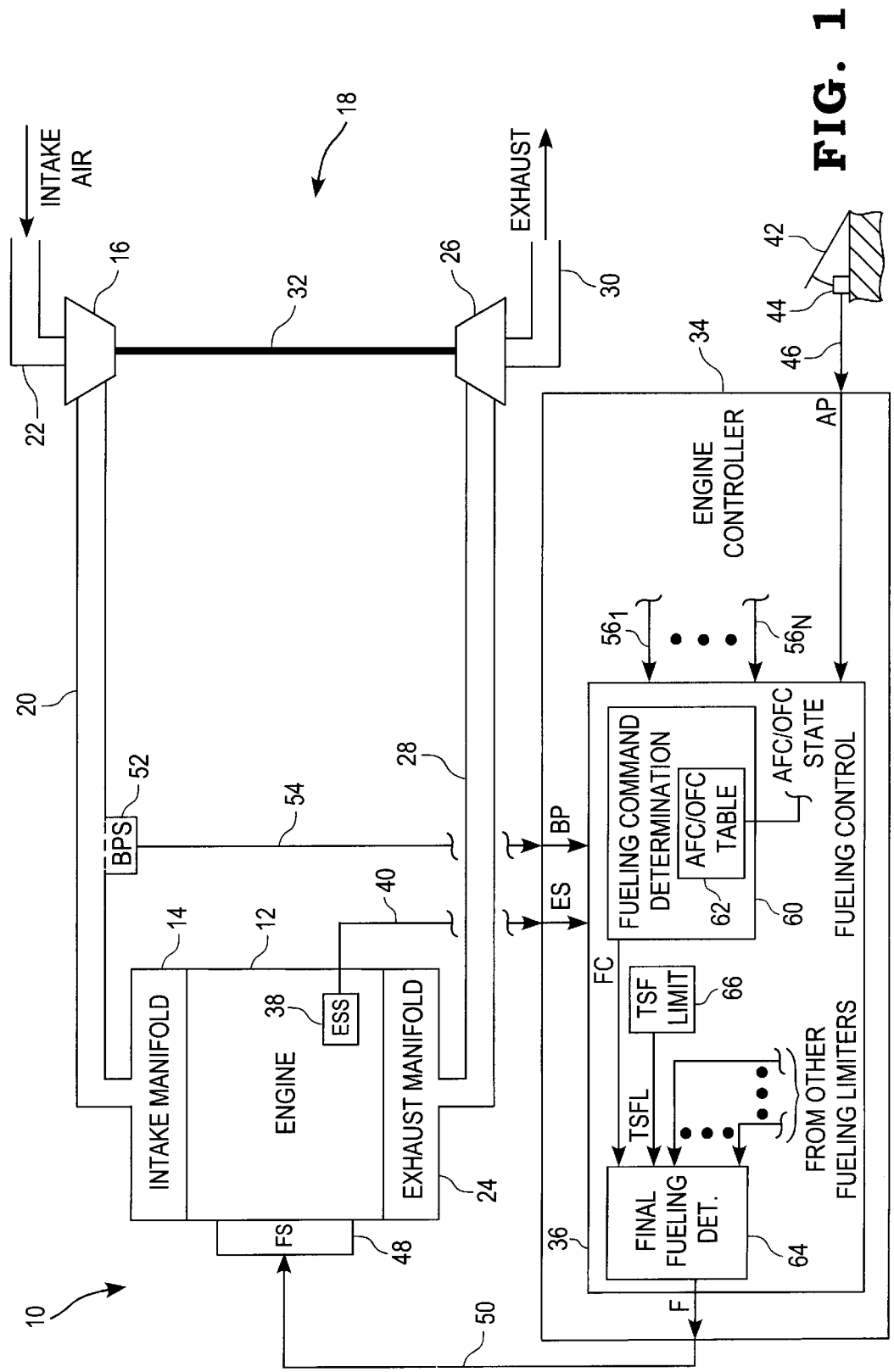
FIG. 1 is a diagram of one illustrative embodiment of a system for limiting the rotational speed of a turbocharger coupled to an internal combustion engine.

For the purposes of promoting an understanding of the principles of the invention, reference will now be made to a number of embodiments illustrated in the drawings and specific language will be used to describe the same. It will nevertheless be understood that no limitation of the scope of the invention is thereby intended. Referring now to FIG. 1, one illustrative embodiment of a system 10 for limiting the rotational speed of a turbocharger 18 coupled to an internal combustion engine 12 is shown. System 10 includes an internal combustion engine 12 having an intake manifold 14 fluidly coupled to an outlet of a compressor 16 of a turbocharger 18 via an intake conduit 20, wherein the compressor 16 includes a compressor inlet coupled to an intake conduit 22 for receiving fresh air therefrom. The turbocharger compressor 16 is mechanically coupled to a turbocharger turbine 26 via a drive shaft 32, wherein turbine 26 includes a turbine inlet fluidly coupled to an exhaust manifold 24 of engine 12 via an exhaust conduit 28, and further includes a turbine outlet fluidly coupled to ambient via an exhaust conduit 30.

System 10 includes an engine controller 34 that is microprocessor-based and is generally operable to control and manage the overall operation of engine 12. Engine controller 34 includes a memory unit as well as a number of inputs and outputs for interfacing with various sensors and systems coupled to engine 12. Controller 34, in one embodiment, may be a known control unit sometimes referred to as an electronic or engine control module (ECM), electronic or engine control unit (ECU) or the like, or may alternatively be a general purpose or application specific control circuit capable of operation as will be described hereinafter. In any case, engine controller 34 includes one or more control algorithms, as will be described in greater detail hereinafter, for limiting the rotational speed of the turbocharger 18.

Engine controller 34 includes a number of inputs for receiving signals from various sensors or sensing systems associated with system 10. For example, engine 12 includes an engine speed sensor 38 having an output electrically connected to an engine speed input, ES, of engine controller 34 via signal path 40. In one embodiment, engine speed sensor 38 is a Hall effect sensor operable to sense passage thereby of a number of teeth formed on a gear or tone wheel rotating synchronously with the engine crankshaft (not shown). Alternatively, engine speed sensor 38 may be any known sensor operable to sense engine rotational speed including, for example, a variable reluctance sensor. In any case, engine speed sensor 38 is operable to produce an engine speed signal indicative of rotational speed of the engine 12.

System 10 further includes an accelerator pedal 42 having an accelerator pedal position sensor 44 electrically connected to an accelerator pedal input, AP, of engine controller 34 via signal path 46. In one embodiment, sensor 44 includes a potentiometer having wiper mechanically coupled to the accelerator pedal 42 such that the potentiometer produces a voltage between the wiper and a reference end of the potentiometer that varies as a function of the position of the accelerator pedal 42 relative to a reference position. Alternatively, sensor 44 may be any known sensor operable to produce a signal indicative of accelerator pedal position, accelerator pedal deflection, pressure applied to the accelerator pedal 42 or the like. In any case, sensor 44 is operable to produce an accelerator pedal signal indicative of driver requested torque or fueling, as is known in the art.

System 10 further includes an intake manifold pressure, or boost pressure, sensor 52 that is disposed in fluid communication with intake conduit 20 and electrically connected to a boost pressure input, BP, of engine controller 34 via signal path 54. Alternatively, sensor 52 may be disposed directly in fluid communication with the intake manifold 14. In any case, sensor 52 may be of known construction, and is generally operable to produce an intake manifold pressure, or boost pressure, signal on signal path 62 that is indicative of the pressure within the intake conduit 20 and intake manifold 14.

Engine controller 34 also includes a number of outputs for controlling one or more engine control mechanism associated with engine 12 and/or system 10. For example, engine controller 34 includes a fueling control block 36 having a fueling command determination block 60 that is responsive to a number of input signals including, for example, engine speed, driver requested torque, boost pressure, and a number of other signals $56_1$–$56_N$, to determine a current fueling command, FC, in manner well-known in the art. The fueling command determination block 60 includes a conventional air-to-fuel ratio or oxygen-to-fuel ratio control block 62 operable to limit the fueling command, FC, under certain engine operating conditions wherein desired air-to-fuel or oxygen-to-fuel ratios cannot be achieved instantaneously due to inadequate intake air flow. For example, in turbocharged engines an instantaneous change from a low level of fueling to a high level of fueling may require a certain intake mass air flow rate to maintain an acceptable air-to-fuel or oxygen-to-fuel ratio that the turbocharger is unable to provide until the engine exhaust gas pressure increases sufficiently to drive the turbocharger turbine in a manner that allows the turbocharger compressor to supply the required intake mass air flow rate. Under such conditions, conventional air-to-fuel or oxygen-to-fuel control strategies are operable to limit engine fueling in a manner that maintains an acceptable air-to-fuel or oxygen-to-fuel ratio until sufficient intake air flow can be supplied to maintain acceptable air-to-fuel or oxygen-to-fuel ratios with the increased engine fueling. In the embodiment illustrated in FIG. 1, the air-to-fuel or oxygen-to-fuel control strategy is implemented as an air-to-fuel or oxygen-to-fuel control (AFC/OFC) table 62 populated with values that limit the fueling command, FC, as a function of at least boost pressure and driver requested torque. In this embodiment, the fueling command determination block maintains an AFC/OFC state signal or bit having a value indicative of the state of AFC/OFC control. For example, when the fueling command, FC, is AFC/OFC limited; e.g., by table 62, the AFC/OFC state signal may be set to a logic high level, and when the fueling command, FC, is not AFC/OFC limited the AFC/OFC state signal may be set to a logic low level. It is to be understood that the air-to-fuel or oxygen-to-fuel control strategy may alternatively be implemented within engine controller 34 in a variety of known ways, and that the engine controller 34 will in any of these implementations have knowledge of when and whether engine fueling is AFC/OFC limited. Any such alternate implementation of a conventional air-to-fuel or oxygen-to-fuel strategy is intended to fall within the scope of the present invention.

The fueling command, FC, is supplied as one input to a final fueling determination block 64 having a number of additional inputs receiving fueling limit signals from a corresponding number of conventional fuel limiting strategies included (but not shown) within the fueling control block 36. Examples of such conventional fuel limiting strategies include, but are not limited to, one or more of a high speed governor, an idle speed governor, an altitude compensation fuel limiter, and the like. The final fueling determination block 64 is operable to process the fueling command, FC, and the various fueling limit signals and produce a fueling signal, F, on signal path 50. The final fueling determination block 64 includes a "min-wins" strategy operable to limit the fueling signal, F, to the minimum value of the fueling command, FC, and any of the various fuel limiting signals or values. A conventional fuel system 48 is coupled to engine 12, and is responsive to the fueling signal, F, to supply fuel to the engine 12. It is to be understood that while only a single signal path 50 is illustrated in FIG. 1, system 10 may include a number of signal paths electrically connecting the engine controller 34 to the fuel system 48, wherein the engine controller 34 may be operable as is known in the art to supply a corresponding number of different fueling signals to individual ones or combinations of fuel dispensing mechanisms.

In system 10 illustrated in FIG. 1, further includes a turbocharger speed fueling limit block 66 supplying a turbocharger speed fueling limit, TSFL, to the final fueling determination block. The final fueling determination block 64 is operable, as will be described in greater detail hereinafter, to limit the fueling signal, F, according to the turbocharger speed fueling limit, TSFL, under specified operating conditions. The turbocharger speed fueling limit, TSFL, is dependent upon the configuration of the engine 12, and is selected to limit the fueling signal, F, in such a manner that limits the rotational speed of the turbocharger 18 to a desired turbocharger rotational speed limit.

Figure 2:
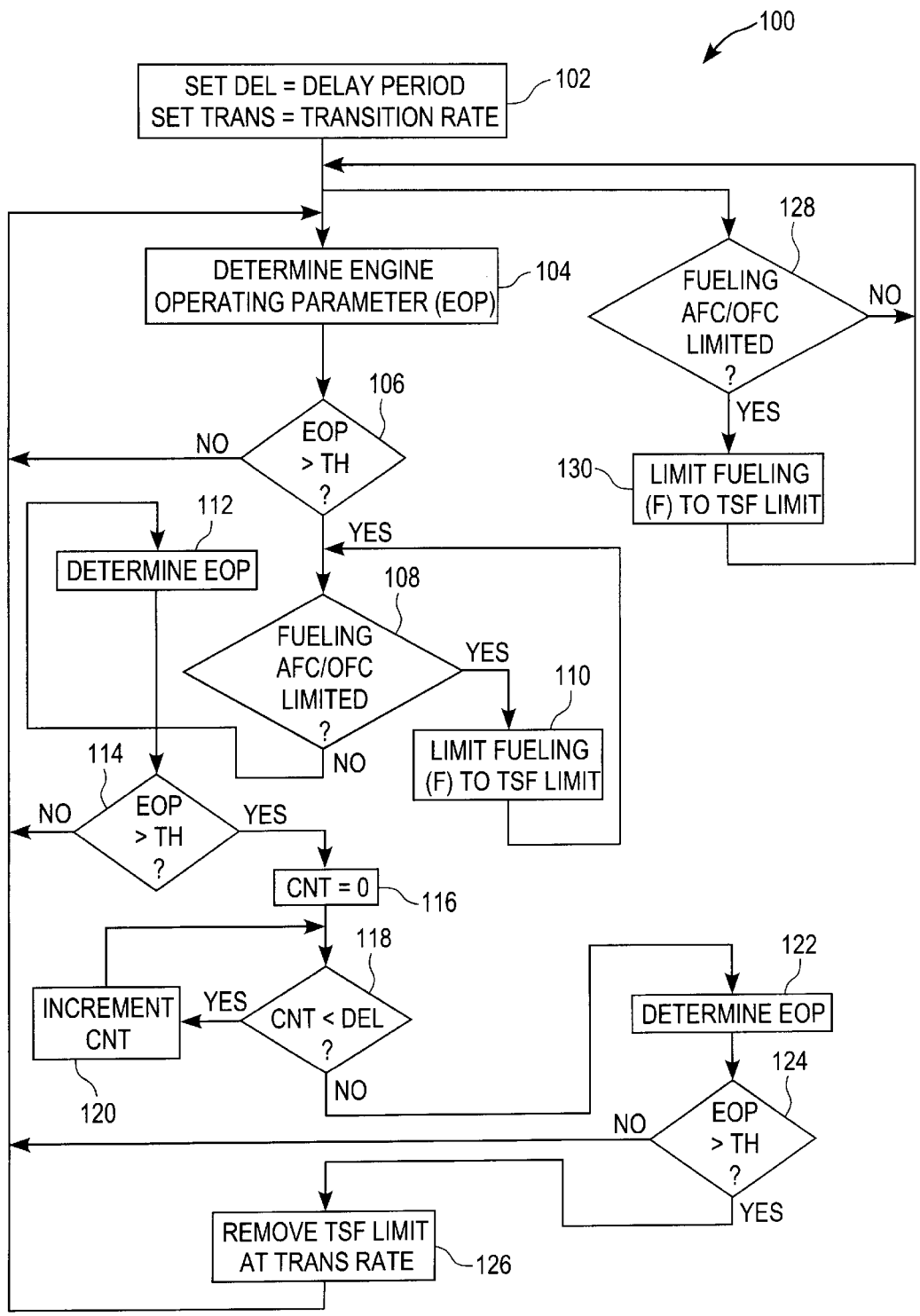
FIG. 2 is a flowchart of one illustrative embodiment of a software algorithm for limiting turbocharger speed in the system of FIG. 1.

Referring now to FIG. 2, a flowchart is shown of one illustrative embodiment of a software algorithm 100 for limiting turbocharger rotational speed in the system 10 of FIG. 1. Algorithm 100 is stored within the memory unit (not shown) of the engine controller 34, and is executable by controller 34 to limit turbocharger rotational speed. Algorithm 100 begins at step 102 where a delay period parameter, DEL, is set to a desired delay period, and a transition rate parameter, TRANS, is set to a desired transition rate. Both DEL and TRANS may range anywhere from zero to tens or even hundreds of seconds, and typical example values for each parameter in one embodiment of system 10 will be provided hereinafter with respect to FIG. 3.

Following step 102, algorithm 100 advances to step 104 where controller 34 is operable to determine an engine operating parameter (EOP). In one embodiment of algorithm 100, the engine operating parameter, EOP, is engine acceleration rate, and controller 34 is operable in this embodiment to execute step 104 by processing the engine speed signal provided by the engine speed sensor 38 according to a well-known mathematical relationship to determine engine acceleration rate information therefrom. In an alternate embodiment, the engine operating parameter, EOP, is a change in boost pressure, and controller 34 is operable in this embodiment to execute step 104 by monitoring a rate of change of the boost pressure signal produced by the intake manifold or boost pressure sensor 52. In another alternate embodiment, the engine operating parameter, EOP, is a change in driver requested torque, and controller 34 is operable in this embodiment to execute step 104 by monitoring a rate of change of the accelerator pedal signal produced by the accelerator pedal sensor 44. In still another alternate embodiment, the engine operating parameter, EOP, is a change in engine load or the fueling command, FC, wherein engine load is generally understood to be a function of the current value of the fueling command, FC. In one embodiment of system 10, for example, engine load is defined as a ratio of the current value of the fueling command, FC, and a difference between a maximum, or "full-load", fueling command and a minimum, or "no-load" fueling command. In any case, controller 34 is operable in this embodiment to execute step 104 by monitoring a rate of change of the fueling command, FC, or the engine load value computed by controller 34 as a function of the fueling command, FC.

As it relates to algorithm 100, the engine operating parameter, EOP, is generally one from which it may readily be determined whether the output torque of engine 12 is rapidly increasing, and in this sense the engine operating parameter, EOP, may include any combination of engine acceleration, change in boost pressure, change in driver s requested torque, change in commanded fueling and/or change in engine load. Alternatively still, the engine operating parameter may be or include any one or more other or additional parameters from which it may be determined whether the engine output torque is rapidly increasing, including one or more "virtual sensor" algorithms configured to estimate an engine operating parameter as a function of one or more other engine operating parameters. Examples of such "virtual sensor" algorithms include, but are not limited to, those that estimate boost pressure, engine output torque, turbocharger rotational speed, engine exhaust temperature, engine exhaust pressure, and/or the like.

Following step 104, algorithm 100 advances to step 106 where the engine controller 34 is operable to compare the engine operating parameter, EOP, determined at step 104 to a suitable threshold value, TH. The threshold value, TH, is of course dependent upon the nature of the engine operating parameter, EOP, and should in any case be selected to be indicative of the engine output torque rapidly increasing when the engine operating parameter, EOP, exceeds TH. For example, if the engine operating parameter, EOP, is engine acceleration, the threshold value, TH, should be an acceleration rate threshold above which is indicative of rapidly increasing engine output torque. As another example, if the engine operating parameter, EOP, is the change in driver requested torque, the threshold value, TH, should be an accelerator pedal rate of change threshold above which is indicative of rapidly increasing engine output torque. As yet another example, if the engine operating parameter, EOP, is the change in boost pressure, the threshold value, TH, should be a boost pressure rate of change threshold above which is indicative of rapidly increasing engine output torque. As a further example, if the engine operating parameter, EOP, is the change in commanded fueling, the threshold value, TH, should be a fueling command rate of change threshold above which is indicative of rapidly increasing engine output torque. As still a further example, if the engine operating parameter, EOP, is the change in engine load, the threshold value, TH, should be an engine load rate of change threshold above which is indicative of rapidly increasing engine output torque. Those skilled in the art will recognize that other suitable threshold values may be used for other engine operating parameters, and that such other engine operating parameters and threshold values thereof are intended to fall within the scope of the present invention.

Algorithm 100 advances from step 106 to step 108 where the engine controller 34 is operable to determine whether engine fueling is currently AFC/OFC limited. In one embodiment, controller 34 is operable to execute step 108 by monitoring the status of the AFC/OFC state signal or bit described hereinabove with respect to FIG. 1. In other embodiments, controller 34 generally has knowledge of when and whether engine fueling is AFC/OFC limited as described hereinabove, and in those embodiments controller 34 may be operable to execute step 108 by monitoring the AFC/OFC control strategy via any of various known techniques. In any case, if controller 34 determines at step 108 that engine fueling is currently AFC/OFC limited, algorithm execution advances to step 110 where controller 34 is operable to limit the fueling signal, F, according to the turbocharger speed fueling limit, TSFL. In the embodiment illustrated in FIG. 1, controller 34 is operable to execute step 110 by immediately limiting, via the final fueling determination block 64, the fueling signal, F, according to at least the turbocharger speed fueling limit produced by block 66. If any other fueling limiter included within the controller 34 provides to the final fueling determination block 64 a lower or lesser fueling limit, then the fueling signal, F, will be limited by block 64 to that lower or lesser fueling limit. However, in cases where no lower or lesser fueling limits are supplied to block 64, the maximum fueling signal, F, produced by block 64 will be limited according to the turbocharger speed fueling limit, TSFL. As described hereinabove, TSFL is selected such that the resulting engine output torque is limited in such a manner that results in the rotational speed of the turbocharger 18 being limited to a first turbocharger rotational speed limit. Alternatively, controller 34 may be operable at step 110 to gradually impose the TSFL limit on engine fueling at a predefined rate; e.g., at the transition rate defined by TRANS or other suitable rate. In any case, step 110 loops back to step 108 where controller 34 is again operable to determine whether engine fueling is still AFC/OFC limited.

If/when controller 34 determines at step 108 that engine fueling is not, or no longer, AFC/OFC limited, algorithm execution advances to steps 112 and 114 where controller 34 is operable to determine a current value of the engine operating parameter, EOP, and to compare this current EOP value to the EOP threshold value, TH. If, at step 114, EOP is no longer above the threshold value, TH, algorithm execution loops back to step 104. If, however, controller 34 determines at step 114 that EOP is still above the threshold value, TH, algorithm execution advances to step 116 where controller 34 is operable to set a counter value, CNT, to a reference value; e.g., zero. Thereafter at step 118, controller 34 is operable to compare the counter value, CNT, to the delay period, DEL, and if CNT is less than DEL algorithm execution advances to step 120 where controller 34 increments the counter value, CNT, before looping back to step 118. If/when the controller 34 determines at step 118 that the counter value, CNT, has reached the delay period value, DEL, advances to steps 122 and 124 where controller 34 is operable to again determine a current value of the engine operating parameter, EOP, and to compare this current EOP value to the EOP threshold value, TH. If, at step 124, EOP is no longer above the threshold value, TH, algorithm execution loops back to step 104. If, however, controller 34 determines at step 124 that EOP is still above the threshold value, TH, algorithm execution advances to step 126 where controller 34 is operable to remove the turbocharger speed fueling limit at the transition rate, TRANS, and thereafter allow for default fueling. In the embodiment illustrated in FIG. 1, controller 34 is operable to execute step 126 by linearly increasing, via the final fueling determination block 64, the turbocharger speed fueling limit at the transition rate, TRANS, until the fueling signal, F, is limited only by the fueling command, FC, or by any one of the other fueling limiters included within controller 34. In an alternate embodiment, controller 34 may be operable at step 126 to increase the turbocharger speed fueling limit in a non-linear fashion. In any case, the term "default fueling" is defined for purposes of this document as engine fueling that would otherwise occur absent algorithm 100, and is that which results in the engine 12 producing a default engine output torque. In the embodiment illustrated in FIG. 1 "default fueling" accordingly corresponds to the fueling command, FC, limited by any one or more conventional fueling limiting algorithms resident within controller 34, and the engine 12 is responsive to such default fueling conditions to produce a correspondingly default engine output torque. Algorithm execution loops from step 126 back to step 104.

Concurrent with the foregoing control loop defined by steps 104–126, algorithm 100 also repeatedly executes steps 128 and 130. At step 128, the engine controller 34 is operable to determine whether engine fueling is currently AFC/OFC limited using any one or more of the techniques described hereinabove. If controller 34 determines at step 128 that engine fueling is currently AFC/OFC limited, algorithm execution advances to step 130 where controller 34 is operable to limit the fueling signal, F, according to the turbocharger speed fueling limit, TSFL as described hereinabove. From the "NO" branch of step 128 and from step 30, algorithm execution loops back to the input of step 128.

From the foregoing it should be apparent that algorithm 100 is configured to limit engine output torque, via limiting the final fueling signal, F, in such a manner that results in turbocharger rotational speed being limited to a first maximum turbocharger rotational speed whenever engine fueling is AFC/OFC limited. Algorithm 100 is further configured to monitor one or more engine operating parameters to determine whether engine output torque is rapidly increasing in a sustained fashion, such as would occur when the vehicle carrying engine 12 is climbing a hill, or the like. Under such conditions when a bonafide need for increased engine output torque is detected, engine output torque is limited as just described only for as long as engine fueling is thereafter AFC/OFC limited, and engine output torque is then returned to its default value after a programmable delay period and at a programmable transition rate. By so limiting engine output torque except under conditions of a rapid and sustained increase in engine output torque demand, turbocharger rotational speed may be limited to the first maximum turbocharger rotational speed limit for a substantial portion of the engine duty cycle. When a bonafide need for increased engine output torque exists, turbocharger rotational speeds above the first maximum turbocharger rotational speed limit are briefly and controllably allowed.

Figure 3:
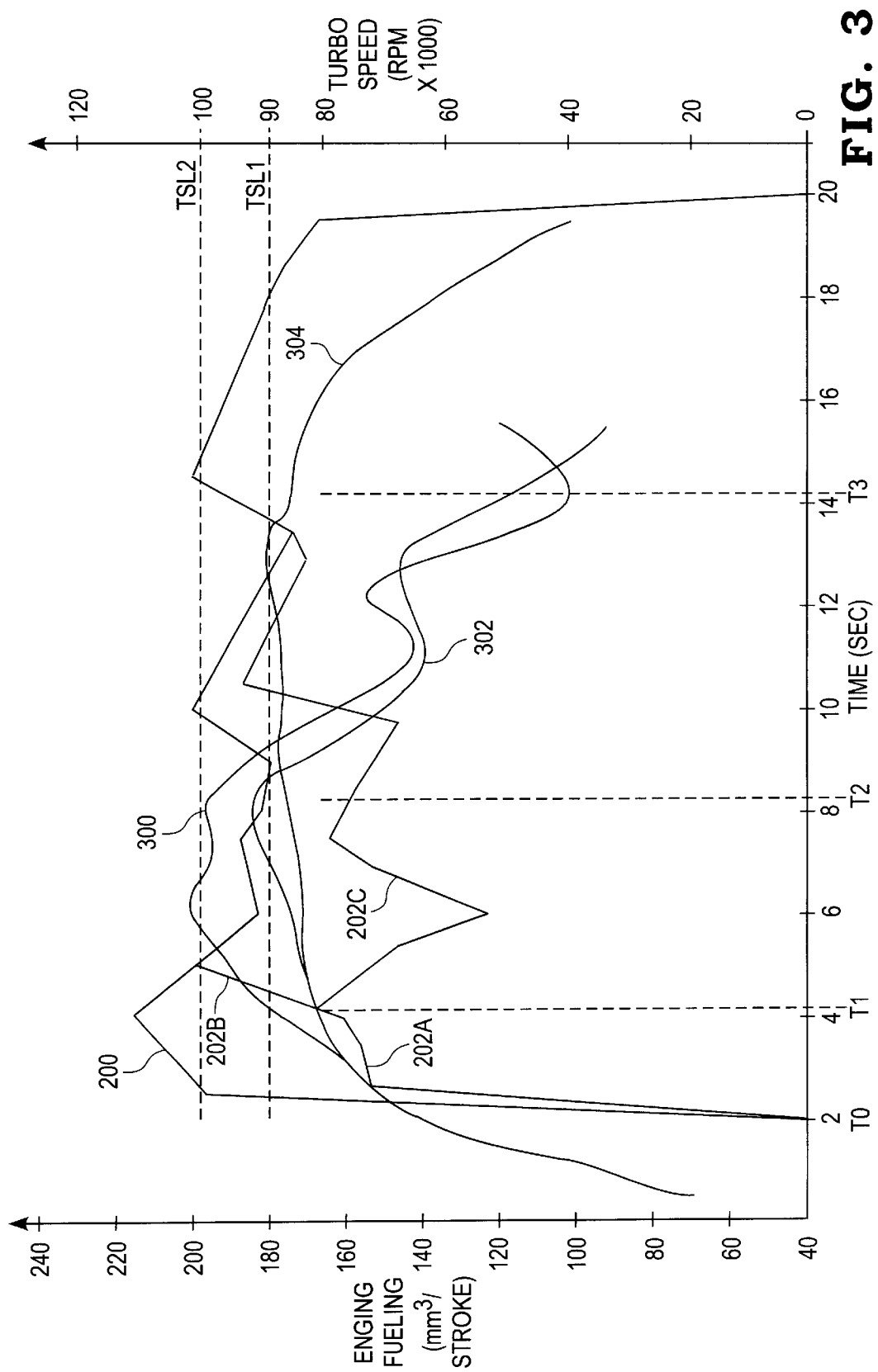
FIG. 3 includes plots of engine fueling and turbocharger rotational speed vs. time illustrating example engine fueling and turbocharger speed responses resulting from various configurations of the algorithm of FIG. 2.

Referring now to FIG. 3, plots of engine fueling and turbocharger rotational speed vs. time are shown illustrating example engine fueling and turbocharger speed responses resulting from various configurations of the algorithm of FIG. 2. The waveforms illustrated in FIG. 3 represent a number of variations of algorithm 100 implemented in a specific application wherein engine 12 is carried by a passenger bus having an automatic transmission. It will be understood that the plots of FIG. 3 are provided only for the purpose of illustrating some of the features of algorithm 100, and are not intended to limit in any way the scope of the claims appended hereto. Waveform 200 is driver-demanded fueling, and represents the fueling signal, F, that would result from driver actuation of the accelerator pedal 42 without any AFC/OFC limiting. Waveform segment 202A is a portion of the actual fueling signal, F, produced by the final fueling determination block 64, and represents the driver-demanded fueling signal 200 limited by the AFC/OFC control block 62. Waveform 200 is indicative of a rapid increase in engine output torque demand, and the fueling signal, F, is therefore initially AFC/OFC limited for the period of time between T0 and T1 as indicated by waveform segment 202A. At time T1, AFC/OFC fuel limiting has concluded and without algorithm 100 the default fueling signal, F, would conventionally increase linearly up to the driver-demanded fueling 200 as illustrated by waveform segment 202B in FIG. 3. Under such conditions, the resulting turbocharger rotational speed 300 would increase to a maximum value above a first specified turbocharger rotational speed limit, TSL1 (e.g., 90,000 RPM) and also above a second higher turbocharger rotational speed limit, TSL2 (e.g., 100,000 RPM). In this example, TSL1 corresponds to a bus turbocharger speed limit, above which turbocharger rotational speed in certain bus applications is considered to be undesirable, and TSL2 corresponds to a so-called automotive turbocharger speed limit, above which turbocharger rotational speed in general automotive applications is considered to be undesirable.

In the example illustrated in FIG. 3 as it relates to algorithm 100, the change in driver-demanded fueling 200 is the engine operating parameter, EOP, and the change in driver-demanded fueling threshold is set at, for example, 150 mm$^3$/stroke. The change from 40 mm$^3$/stroke to approximately 200 mm$^3$/stroke at time T0 is thus greater than the threshold value of 150 mm$^3$/stroke, and since the driver demanded fueling 200 stays above 150 mm$^3$/stroke for the following 18 seconds, the change in driver-demanded fueling corresponds to a rapid and sustained increase in engine output torque demand. Algorithm 100 thus advances through steps 102–106 to step 108.

Activation by the fueling command determination block 60 of AFC/OFC control following time T0 causes the fueling signal, F, to be limited by steps 108 and 100 according to the turbocharger speed fueling limit, TSFL, although the fueling signal, F, may already be so limited via steps 128–130. In this example, the delay period, DEL, is set to 4.0 seconds, and between T1 and T2, the fueling signal, F, thus continues to be limited according to TSFL via steps 116–120 of algorithm 100 as indicated by waveform segment 202C. In the illustrated example, the final fueling determination block 64 is operable to limit the fueling signal, F, according to the turbocharger speed fuel limit value, TSFL, by subtracting TSFL from the fueling command, FC, produced by block 60. In an alternative embodiment, the final fueling determination block 64 may be configured to limit the fueling signal, F, according to TSFL by limiting the maximum fueling command value, FC, to TSFL. Those skilled in the art will recognize other known fuel limiting strategies for limiting the fueling signal, f, according to the turbocharger speed fuel limit value, TSFL, and any such other known fuel limiting strategies are intended to fall within the scope of the present invention.

Following the delay period defined between T1 and T2, step 126 of algorithm removes the turbocharger speed fueling limit, TSFL, at a rate defined by the transition rate, TRANS. In the example illustrated in FIG. 3, TRANS is set to 6.0 seconds, and the fueling signal, F, thus transitions linearly up to the driver-demanded fueling signal 200 between T2 and T3 as illustrated by waveform segment 202C. After T3, the fueling signal, F, tracks the driver-demanded fueling signal 200, and the output torque produced by engine 12 thus corresponds to default engine output torque levels. If/when engine fueling thereafter becomes AFC/OFC limited (not shown in FIG. 3), steps 128–130 of algorithm again limit the fueling signal, F, according to the turbocharger speed fueling limit, TSFL.

The turbocharger speed waveform 304 shown in FIG. 3 results from the illustrated fuel limiting strategy; i.e., DEL=4.0 seconds and TRANS=6.0 seconds as depicted in FIG. 3. With DEL and TRANS so defined, the resulting turbocharger speed 304 is substantially limited to the first maximum turbocharger speed limit, TSL1. By comparison, waveform 302 results from a fuel limiting strategy similar to that illustrated in FIG. 3, but with DEL=0.0 seconds and TRANS=5.0 seconds. It will be noted that with DEL and TRANS so defined, the resulting turbocharger speed 302 slightly exceeds TSL1 for a brief time period around T2, but is otherwise maintained below TSL1.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A system for limiting rotational speed of a turbocharger coupled to an internal combustion engine, the system comprising:
   a fuel system responsive to a fueling signal to supply fuel to the engine; and
   a controller determining a fueling command that is air-to-fuel or oxygen-to-fuel control (AFC/OFC) limited under certain engine operating conditions and is otherwise not AFC/OFC limited, the controller producing the fueling signal as a function of the fueling command, the controller limiting the fueling signal according to a turbocharger speed fuel limit in a manner that limits the rotational speed of the turbocharger to a first turbocharger speed limit whenever the fueling command is AFC/OFC limited.

2. The system of claim 1 wherein the controller includes a fueling command determination strategy operable to determine the fueling command as a function of a number of engine operating condition signals.

3. The system of claim 2 wherein the fueling command determination strategy includes an AFC/OFC control strategy limiting a maximum value of the fueling command under the certain engine operating conditions, and otherwise not limiting the maximum value of the fueling command.

4. The system of claim 3 wherein the controller further includes a final fueling determination strategy producing the fueling signal as a function of at least the fueling command.

5. The system of claim 4 wherein the controller further includes a number of fuel limiting strategies each providing a fuel limiting value to the final fueling determination strategy, the final fueling determination strategy producing the fueling signal as a function of the fueling command and the number of fuel limiting values.

6. The system of claim 5 wherein the controller further includes a turbocharger speed fuel limit strategy providing the turbocharger speed fuel limit to the final fueling determination strategy, the final fueling determination strategy limiting the fueling signal according to the turbocharger speed fuel limit.

7. A system for limiting rotational speed of a turbocharger coupled to an internal combustion engine, the system comprising:
   means for determining a change in an engine operating parameter;
   a fueling system responsive to a fueling signal to supply fuel to the engine; and
   a controller determining a fueling command that is air-to-fuel or oxygen-to-fuel control (AFC/OFC) limited under certain engine operating conditions and is otherwise not AFC/OFC limited, the controller producing the fueling signal as a function of the fueling command and limiting the fueling signal according to a turbocharger speed fuel limit in a manner that limits the rotational speed of the turbocharger to a first turbocharger speed limit whenever the fueling command is AFC/OFC limited, the controller removing the turbocharger speed fuel limit from the fueling signal when the change in the engine operating parameter exceeds a threshold value and the fueling command is thereafter no longer AFC/OFC limited.

8. The system of claim 7 wherein the engine operating parameter is engine acceleration;
   and wherein the means for determining a change in an engine operating parameter includes:
   an engine speed sensor producing an engine speed signal indicative of engine rotational speed; and
   means for determining engine acceleration as a function of the engine speed signal.

9. The system of claim 7 wherein the engine operating parameter is driver requested torque;
   and wherein the means for determining a change in the engine operating parameter includes:
   an accelerator pedal sensor producing an accelerator pedal signal indicative of a position of an accelerator pedal relative to a reference position; and
   means for determining a change in the accelerator pedal signal.

10. The system of claim 7 wherein the engine operating parameter is turbocharger boost pressure;
    and wherein the means for determining a change in the engine operating parameter includes:
    a boost pressure sensor producing a boost pressure signal indicative of air pressure within an intake manifold of the engine; and
    means for determining a change in the boost pressure signal.

11. The system of claim 7 wherein the engine operating parameter is engine load;
    and wherein the means for determining a change in the engine operating parameter includes:
        means responsive to the fueling command for determining the engine load; and
        means for determining a change in the engine load.

12. The system of claim 7 wherein the engine operating parameter is the fueling command;
    and wherein the means for determining a change in the engine operating parameter includes means for determining a change in the fueling command.

13. The system of claim 7 wherein the controller includes a delay value stored therein;
    and wherein the controller is operable to remove the turbocharger speed fuel limit from the fueling signal upon expiration of a time period defined by the delay value following the change in the engine operating parameter exceeding the threshold value and the fueling command thereafter no longer being AFC/OFC limited.

14. The system of claim 7 wherein the controller includes a transition rate value stored therein;
    and wherein the controller is operable to remove the turbocharger speed fuel limit from the fueling signal at a rate defined by the transition rate value.

15. A method for limiting rotational speed of a turbocharger coupled to an internal combustion engine having a fuel system responsive to a fueling signal to supply fuel to the engine, the fueling signal being a function of a fueling command that is air-to-fuel or oxygen-to-fuel control (AFC/OFC) limited under at least a first set of engine operating conditions and is otherwise not AFC/OFC limited, the method comprising the steps of:
    limiting the fueling signal according to a turbocharger speed fuel limit whenever the fueling command is AFC/OFC limited to limit the rotational speed of the turbocharger to a first turbocharger speed limit;
    determining a change in an engine operating parameter; and
    removing the turbocharger speed fuel limit from the fueling signal when the change in the engine operating parameter exceeds a threshold value and the fueling command is thereafter no longer AFC/OFC limited.

16. The method of claim 15 wherein the removing step further includes removing the turbocharger speed fuel limit from the fueling signal after expiration of a delay period following the change in the engine operating parameter exceeding the threshold value and the fueling command thereafter no longer being AFC/OFC limited.

17. The method of claim 15 wherein the removing step further includes removing the turbocharger speed fuel limit from the fueling signal at a predefined transition rate.

18. The method of claim 15 wherein the engine operating parameter is engine acceleration.

19. The method of claim 15 wherein the engine operating parameter is driver S requested torque.

20. The method of claim 15 wherein the engine operating parameter is turbocharger boost pressure.

21. The method of claim 15 wherein the engine operating parameter is engine load.

22. The method of claim 15 wherein the engine operating parameter is the fueling command.

* * * * *